(12) United States Patent
Ullman et al.

(10) Patent No.: US 8,005,920 B2
(45) Date of Patent: Aug. 23, 2011

(54) METHOD AND APPARATUS FOR TRANSMITTING ARBITRARILY LARGE AMOUNTS OF DATA OVER THE INTERNET

(75) Inventors: Cayce M. Ullman, San Jose, CA (US); Brian L. Matthews, Kent, WA (US)

(73) Assignee: PostX Corporation, Cupertino, CA (US)

( * ) Notice: Subject to any disclaimer, the term of this patent is extended or adjusted under 35 U.S.C. 154(b) by 990 days.

(21) Appl. No.: 11/467,113

(22) Filed: Aug. 24, 2006

(65) Prior Publication Data
US 2007/0208824 A1 Sep. 6, 2007

Related U.S. Application Data

(60) Provisional application No. 60/711,512, filed on Aug. 24, 2005.

(51) Int. Cl.
*G06F 15/16* (2006.01)
(52) U.S. Cl. ......... 709/217; 709/227; 709/231; 709/206
(58) Field of Classification Search .................. 709/227, 709/217, 231, 206
See application file for complete search history.

(56) References Cited

U.S. PATENT DOCUMENTS

| | | | |
|---|---|---|---|
| 6,886,013 B1 * | 4/2005 | Beranek | 707/10 |
| 7,003,799 B2 * | 2/2006 | Jorgenson | 726/12 |
| 7,373,500 B2 * | 5/2008 | Ramelson et al. | 713/150 |
| 2002/0083182 A1 * | 6/2002 | Alvarado et al. | 709/231 |
| 2002/0191548 A1 * | 12/2002 | Ylonen et al. | 370/254 |

* cited by examiner

*Primary Examiner* — Kyung-Hye Shin
(74) *Attorney, Agent, or Firm* — Hickman Palermo Truong & Becker LLP (57) ABSTRACT

Embodiments are described that leverage commonly used HTML tags to enable the transfer of large quantities of data in a network. Embodiments are described where large amounts of data can be sent to a server by fragmenting data into small portions and encoding each portion as part of a URL contained in, for example, the src attribute of an <img> tag. The path of this URL can refer to a predetermined resource contained on the server that is responsible for retrieving fragments of data from the requested URL. Each fragment of data can be sent together with whatever additional pieces of information are required by the server to correctly reassemble the portions to obtain the original, defragmented data. Methods are described that enable a client to communicate an arbitrarily large amount of data to a server using only the GET method.

28 Claims, 5 Drawing Sheets

...
```
<img src="http://server/page.jsp?id=42&part=1&data=abcdef">
<img src="http://server/page.jsp?id=42&part=2&data=ghijkl">
<img src="http://server/page.jsp?id=42&part=3&data=mnopqr">
<img src="http://server/page.jsp?id=42&part=4&data=stuvwx">
<img src="http://server/page.jsp?id=42&part=5&data=yz">
...
<form method=GET action="http://server/anotherpage.jsp">
<input type=hidden name=id value=42>
<input name=userdata>
...
</form>
...
```

METHOD AND APPARATUS FOR TRANSMITTING ARBITRARILY LARGE AMOUNTS OF DATA OVER THE INTERNET

CROSS-REFERENCE TO RELATED APPLICATIONS

The present application claims priority from provisional patent application No. 60/711,512 entitled "Method And Apparatus For Transmitting Arbitrarily Large Amounts Of Data Over The Internet," filed Aug. 24, 2005 which is incorporated herein by reference and for all purposes.

BACKGROUND OF THE INVENTION

1. Field of the Invention

The present invention relates to a method for transmitting arbitrarily large amounts of data over the Internet from a client machine to a server using only the HTTP GET method, such that data in excess of traditional URL length maximums enforced by web browsers and servers can be transmitted without using the HTTP POST method.

2. Description of Related Art

Two of the primary methods by which a client communicates with a server across the Internet using the Hypertext Transfer Protocol (HTTP) are the GET and POST methods. Conventionally, the GET method was intended to act as a simple request made by a client, such as a web browser, to a server for a resource, such as an HTML document. A request made by the GET method is conventionally idempotent and simply requests a resource from a server rather than submitting data or altering any data on the server. Methods have the property of "idempotence" if the result of multiple, identical requests is the same as for a single request. The POST method was intended to provide a way for a client, such as a web browser, to submit information to a web server across a network, such as the Internet. Conventionally, the POST method is used for requests that are not idempotent and alter data on the server in some way. Although the GET method is traditionally used for idempotent requests, it may also be used for requests that store or modify data on the server, using the GET method for idempotent requests is strictly a convention and not a technical specification. Note that these methods are also used by Hypertext Transfer Protocol Secure (HTTPS). Although the http: and https: schemes use different underlying connections, they both use the HTTP protocol.

In HTML, GET and POST are the two possible options for how the contents of a form submission are sent to a server. The chosen method is designated in the method attribute of the <form> tag. Whichever method is designated within the HTML <form> tag determines whether the client's web browser will send the data to the server using an HTTP GET or POST request. There are important technical differences between these two methods. When using the GET method, all of the form submission data is combined with the URL of the desired page to create a URL that contains both the path of the desired page and the name-value associations of the form contents. When using the POST method all of the form submission data is included as the body of the request. Various reasons and conventions exist for choosing one method over another. A simple request that does not alter the data on the server would conventionally use the GET method. A common example of this is using a search engine. Typically the search value that the user enters is sent to the server using the GET method and is present in the URL of the resulting page. This is because the request does not alter any of the data on the server; it simply determines what portion of data contained on the server will be returned to the client in order to be displayed. The POST method is instead used when the request may affect the data on the server rather than simply retrieving it. Common examples of this include sending an email, logging in to a system, and placing an order. Although the GET method is traditionally used by HTML forms for idempotent requests, it may also be used for requests that store or modify data on the server.

In addition to the conventional differences and the technical differences between the GET and POST methods, there is one extremely important difference in practice. Although the HTTP specifications do not place any restrictions on the amount of data transmitted by either GET or POST, some web servers and web browsers enforce a maximum URL length. Even though this limitation is not part of the specification for HTTP it has greatly impacted the Internet community because the most widely used and prominent web browsers enforce such a limit. For example, Microsoft's Internet Explorer, which has been the predominant web browser, enforces a maximum URL of 2,083 characters. The implications of this limit are that because the GET method transmits data to the server by encoding it in the URL less than 2,083 bytes of data can be transmitted. Because the POST method transmits data as the body of the request, it does not suffer from any limitation, artificial or otherwise. As a matter of practice, then, the POST method is the only option available whenever a client needed to send an arbitrarily large amount of data to a server in conventional systems.

One example of an application that makes use of HTML forms is an application designed to send encrypted emails. A mechanism for doing this is to send an HTML email that is a form asking for the password to allow the message to be decrypted, and to embed in this email the payload that is the encrypted message as a form element (typically hidden). Then, when the user presses the Submit button after entering the password, a JavaScript routine, also embedded in the message, intercepts the form submission, decrypts the hidden payload, and displays the decrypted message.

This application has the limitation that it relies on JavaScript in order to decrypt and display the message. It is possible for a particular user to have disabled JavaScript or to be using a web browser or other HTML viewer that does not support JavaScript. If this is the case then the application as described will not work. Moreover, some mail clients, notably Yahoo! Mail, either strip an email of JavaScript or modify the script so it is no longer functional. In these cases a solution that does not depend on JavaScript is required.

In order to work around these issues, the described application can implement its HTML form such that if JavaScript does not work, then it will simply function like a standard HTML form and send the form data to a designated URL, in this case a web server. The encrypted message that is the hidden payload may be arbitrarily large, so the POST method must be used. Thus, the encrypted message in the form of a hidden input field, the user's password or other form of credentials, and perhaps some other form data are sent to the server by the POST method. The server can then check the credentials, decrypt the message, and return the correctly decrypted message across a secure Internet connection to the user. This method works and securely decrypts the message in instances where JavaScript is not available.

The above described application is effective in most situations, but some mail clients, notably Microsoft's Outlook Web Access, remove all large form fields from an email. Because the encrypted payload is encoded as a form field and is typically large, the encrypted content is removed by such mail clients. Once the encrypted content has been removed from the message there is no way to retrieve it. The described application thus does not work with such mail clients.

In order to work with mail clients that remove all large form fields, the described application must encode the encrypted payload in another manner. One way to do this is to use many small fields instead of one large field. Then the server can aggregate all of the individual fields to recreate the payload, and then decrypt and return the message. As long as all the fields were small enough to not be removed by the mail client this method would be adequate. However, this solution is made ineffective by some mail clients, notably Microsoft's Outlook Web Access, that change all forms inside an email message to use the GET method instead of POST. As discussed above, this effectively limits the amount of data that can be transmitted from the client's computer to the server through the form contained in the email. Even if small fields are used, all data is encoded into a single URL that would in many cases surpass the size limitations enforced by some servers and web browsers. Regardless of how the form is set up, there is currently no way to guarantee an ability to send an arbitrary amount of data to a server using the GET method. Moreover, there is currently no way for a single form to send several GET requests to the server, and so the data cannot be segmented in that manner.

BRIEF SUMMARY OF THE INVENTION

It is an object of the present invention to provide a method for transmitting arbitrarily large amounts of data from a client to a server across the Internet using HTTP or HTTPS using only the GET method, thus allowing the transfer of an arbitrarily large amount of data when the POST method is not available or is otherwise unacceptable or unsatisfactory.

It is a further object of the present invention to provide a method for transmitting arbitrarily large amounts of data from a client to a server across the Internet using HTTP or HTTPS using only the GET method such that the data does not need to be permanently maintained on the server waiting for the client to retrieve it, but rather all of the data can be stored on the client machine and communicated to the server when necessary, thus allowing the server to only temporarily store such data.

It is a further object of the present invention to provide a method for transmitting, decrypting, and displaying arbitrarily large encrypted emails in mail systems and web browsers that perform any combination of JavaScript removal or tampering, URL length limitations, large form field removal, and limiting form submission to the GET method only.

BRIEF DESCRIPTION OF THE DRAWINGS

The structural and functional aspects of the invention will become understood by those skilled in the art by reference to the following detailed description when taken in conjunction with the appended drawings, in which.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

In describing embodiments of the invention, HTML pages initially viewed by a user will be described as residing on a client computer's data storage device or a data storage device available to the client computer over a local network. However, other configurations are contemplated in which HTML pages may be stored in other locations, including servers, archives, repositories, shared storage, removable storage and on any other suitable storage. It will be appreciated that the embedding of large amounts of data in a web page for submission to a server may avoid the need to store the data permanently on the server. In an example where an HTML page is located on a server, the desired data is typically also stored on the server and it may be beneficial to store the data using a database or other storage system. A simple HTML form could be implemented whereby a GET request can be used to send an identifier that allows the server to recall corresponding data from its database. However, in certain situations, such as in the example of sending and decrypting secure messages, a very large amount of storage would be consumed by storing all associated data on the server. In such situations, it may be beneficial to store portions of the data on client devices where the data is typically accessed. For the purposes of simplifying description of certain embodiments, this latter example will be described in more detail.

Moreover, in the following discussion client originated GET requests are directed to a single server in order to facilitate descriptions of the various embodiments. However, it should be understood that the scope of the described invention is in no way limited to such single server configurations and it is contemplated that, in certain embodiments, configurations employing plural servers will be both desirable and commonplace. It will be apparent to one skilled in the art that much of the functionality described below can be separated and apportioned such that multiple servers can be configured to handle requests just as easily a single server. In multi-server embodiments, a plurality of servers will typically have access to data received and subsequently stored by others of the plurality of servers.

Certain embodiments of the invention leverage the fact that certain HTML tags commonly used and allowed by all web browsers and mail clients can include attributes that require the web browser or mail client to retrieve data from a URL. An example of such a tag is the HTML tag used to display images, <img>. The <img> tag has a source attribute, src, that is typically a URL and represents the source of the image to be displayed. When the browser processes an <img> tag that references a source on a machine other than the local machine, such as a web server, it must issue a simple request using the GET method to retrieve the image from the server. There may be many <img> tags in the HTML file, and each one will cause the web browser or other HTML viewer to issue a simple GET request. In this manner the HTML file that the form is contained within is effectively able to send an arbitrary number of GET requests, even though the form itself can only send one.

Accordingly, in certain embodiments, large amounts of data can be sent to a server. The data can be fragmented into small chunks, and each chunk or portion can be encoded as part of a URL contained in the src attribute of the <img> tag. The path of this URL may refer to a predetermined resource contained on the server that is responsible for retrieving fragments of data from the requested URL. In certain embodiments, each fragment of data can be sent together with whatever additional pieces of information are required by the server to correctly identify the data chunk, such as a variable name, identification number, and sequence number. The server can use these additional pieces of information to correctly reassemble a larger data block that the client was trying to communicate. For example, additional pieces of information can identify a sequence number of a GET request such that a sequence of GET requests required for assembling the data block can be established. The client can thus communicate an arbitrarily large amount of data to the server using only the GET method. If the user still needs to submit more information, then a normal form can be used whose action attribute references a resource on the same server or a different server having access to the data fragments already sent. In addition to whatever information was needed from the user, some additional data may be sent, such as an identification number that the server will use to match this user submission with the data that was previously sent.

Regarding this latter example, in some embodiments, encrypted messages can be decrypted and read even when JavaScript and the POST method is unavailable or otherwise unsatisfactory. In certain embodiments, this application can embed in the URL of the src attribute of <img> tags, fragments of the encrypted message along with any necessary additional data such as a message identification number and a sequence identification number. In this way, the fragment of data can be associated with the correct message and reassembled in the correct order with all of the other message fragments transmitted to the server in the same manner. Thus, by using as many <img> tags as necessary to break the encrypted message into small chunks, the client system can send all of the fragments of the encrypted message to the server. The server can use the additional information of the message ID and sequence ID to reassemble the encrypted message and can then store it temporarily. The user's credentials can then be entered into the form according to normal practice. In addition to the fields needed to obtain the user's credentials and pass them onto the server, some additional fields may be needed for information including the message identification number. When the user's credentials are submitted to the server along with any additional information, such as the message identification number, the server can verify the user's credentials, match the message identification number with the message that is temporarily being stored on the server, and use the credentials to decrypt the message and send it back to the client to be displayed. It will be appreciated that in this instance it may not matter that the user's credentials are submitted to the server using the GET method because only a small amount of information need be transmitted, and this amount of data, in practice, will typically not exceed any artificial URL size limits.

It will be appreciated that although some embodiments use <img> tags to communicate with the server, other tag types may facilitate such communication. As discussed above, any tag having attributes that require the web browser or other HTML viewer to retrieve data from a URL can be used to communicate data to a server. Data can be simply fragmented into manageable chunks and then name and value pairs may be encoded into URLs which will be requested by the web browser or other HTML viewer. In addition to using the src attribute of the <img> tag, possible combinations of attributes and tags include, but are not necessarily limited to, the src attribute of the <frame> tag; the src attribute of the <iframe> tag; the href attribute of the <link> tag; the archive, code, and codebase attributes of the <applet> tag; the src attribute of the <script> tag; the archive, codebase, and data attributes of the <object> tag; as well as the href, pluginspace, pluginurl, src, and target attributes of the <embed> tag.

Figure 1:
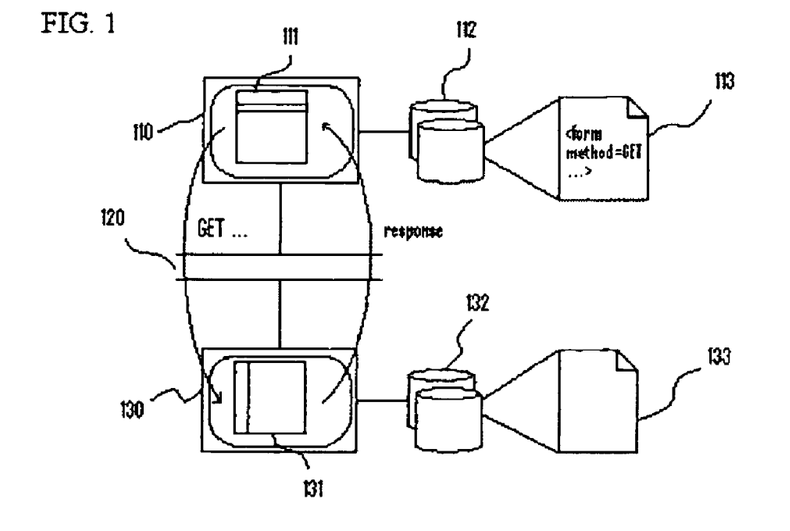
FIG. 1 illustrates the conventional use of the HTTP GET method.

FIG. 1 illustrates an example in which a client computer 110 running a web browser or other computer program 111 capable of displaying HTML. The client computer 110 can typically make use of one or more data storage devices 112 either connected directly to the client computer 110 or available to the client computer 110 over a network. In the example, one of the data storage devices 112 maintains one or more resources, including an HTML document 113. HTML document 113 may contain a Form having a method attribute that specifies the use of the GET method and whose action specifies a path to a resource 133 on a server computer 130. Resource 113 can be any appropriate resource including, but not limited to, a static file or document, and an active component such as a CGI program, Java Server Page (JSP), or Active Server Page (ASP). Client computer 110 typically has access over the Internet 120 to a server computer 130 running a web server or other computer program 131 that is capable of servicing requests for resources residing on one or more data storage devices 132, wherein the one or more data storage devices can be connected directly to the server computer 130 or can be available to the over a network.

In certain embodiments, when a user using client computer 110 instructs web browser 111 to access HTML document 113, web browser 111 may transfer HTML document 113 from data storage device 112 to the client computer 110. Web browser 111 can then interpret HTML document 113. In one example, HTML document 113 typically contains a form which, when selected or submitted by the user, causes the web browser 111 to submit the form data to web server 131 over the Internet 120 using the GET method. Typically, the GET method limits the size of this request issued by the web browser 111 to approximately 1 k-2 k of data. Web server 131 may then receive the request, process the request as appropriate, and then serve a response to web browser 111 across the Internet 120.

Figure 2:
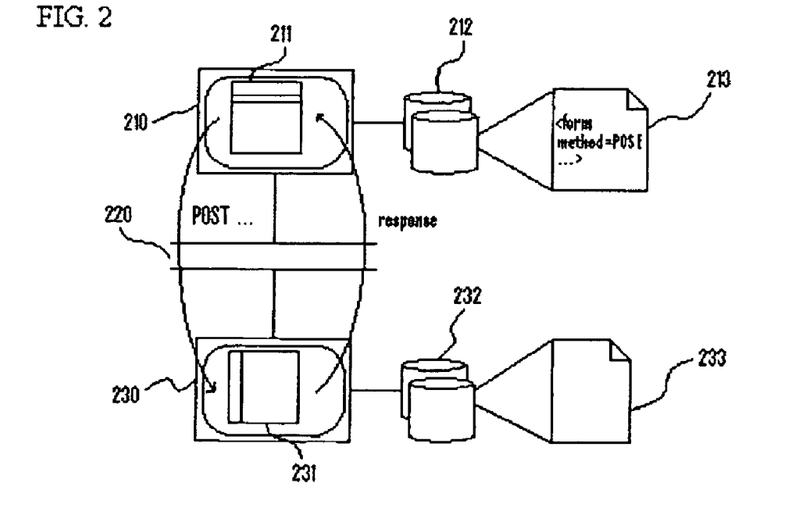
FIG. 2 illustrates the conventional use of the HTTP POST method.

FIG. 2 illustrates an example in which a client computer 210 executes a web browser or other computer program 211 capable of displaying HTML. The client computer 210 may employ one or more data storage devices 212 that can be connected directly to the client computer 210 or be accessed over a network. In the example, one of the data storage devices 212 contains one or more resources, including an HTML document 213 that contains a Form whose method attribute specifies that it will use the POST method and whose action specifies a path to a resource 233 on a server computer 230. A resource can include a static file or document; or an active component such as a CGI program, Java Server Page (JSP), or Active Server Page (ASP).

The client computer 210 in the example typically can access a server computer 230 over the Internet 220 where the server computer 230 executes a web server or other computer program 231 capable of servicing requests that can include requests for resources residing on one or more data storage devices 232 connected directly to the server computer 230 or available over a network.

In the example, a user of client computer 210 can instruct web browser 211 to access HTML document 213, and web browser 211 transfers the document from data storage device 212 containing HTML document 213 to client computer 210. Web browser 211 may then interpret HTML document 213. The HTML document 213 may contain a form that, when submitted by the user, web browser 211 may submit the form data to web server 231 over the Internet 220 using the POST method. Typically, the size of this POST method request is not limited. Upon receiving the request, web server 231 may process the request as appropriate and then serve a response to web browser 211 across the Internet 220.

Figure 3:
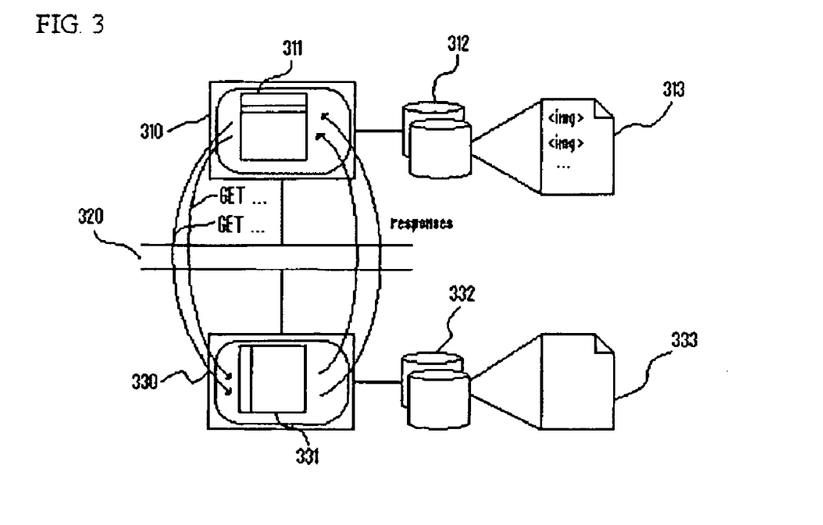
FIG. 3 illustrates an application of the invention that sends an arbitrarily large amount of data using only the HTTP GET method and does not use any input from the user.

FIG. 3 illustrates an example of a client computer 310 running a web browser or other computer program 311 capable of displaying HTML. Client computer 310 may utilize one or more data storage devices 312 that can be connected directly to client computer 310 or be available to client computer 310 over a network. At least one of the one or more data storage devices 312 typically maintains resources including an HTML document 313 that contains, among other data, several <img> tags whose src attributes specify a path to a resource 333 on a server computer 330. Resources can include a static file or document and an active component such as a CGI program, Java Server Page (JSP), or Active Server Page (ASP). The src attributes of these <img> tags can also contain additional data encoded in the query portion of the URL that will be communicated to the server computer 330. The additional data may be encoded using any appropriate technique known by those skilled in the art.

Client computer 310 through the Internet 320, typically has access to at least one server computer 330 running a web server or other computer program 331 capable of servicing requests for resources residing on one or more data storage devices 332, where the data storage devices can be connected directly to server computer 330 or available to server computer 330 by means of a network. When a user using client computer 310 instructs the web browser 311 to access HTML document 313, web browser 311 may transfer the HTML document 313 from a data storage device 312, identified as containing the HTML document 313, to client computer 310. Web browser 311 can then interpret HTML document 313. HTML document 313 typically comprises several <img> tags. In the example, when web browser 311 processes each individual <img> tag in HTML document 313 it may issue a GET request to the server specified by the tag's src attribute URL for the resource specified in the path portion of the same URL. The resource may comprise a file or CGI script, JSP, or other active component. In the illustrated case the web browser 311 may issue a GET request across the Internet 320 to web server 331 for resource 333. Web server 331 can then receive the request and process it appropriately, extracting additional information that was encoded in the requested URL, and then serving a response to web browser 311 across the Internet 320.

It will be appreciated that, although each individual GET request sent from web browser 311 across the Internet 320 to web server 331 suffers from size limitations, in certain embodiments, an arbitrary number of GET requests can be issued such that any amount of data can be transmitted from web browser 311 across the Internet 320 to web server 331 using only the GET method.

Figure 4:
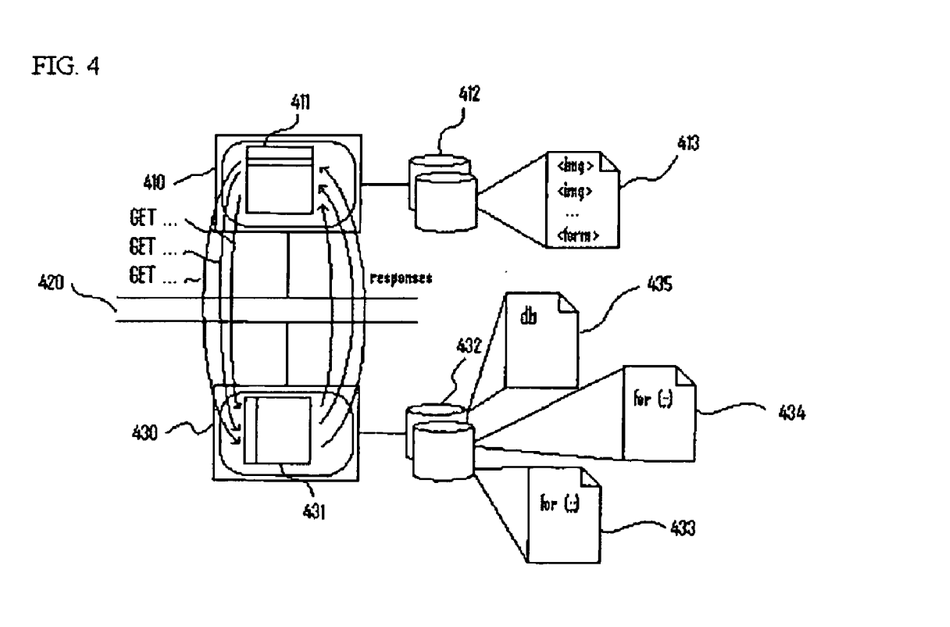
FIG. 4 illustrates an application of the invention that sends an arbitrarily large amount of data using only the HTTP GET method and receives data from the user using an HTML form.

FIG. 4 illustrates an example in which a client computer 410 runs a web browser or other computer program 411 capable of displaying HTML. The client computer 410 can utilize one or more data storage devices 412 either connected directly to client computer 410 or available over a network. Typically, at least one of data storage devices 412 maintains an HTML document 413 that contains, among other data, several <img> tags and a <form> tag. Each of the <img> tags may include a src attribute specifying a path to a resource 433 on a server computer 430. A resource can include static files or documents and active components such as CGI programs, Java Server Pages (JSP), and Active Server Pages (ASP). The src attributes of these <img> tags may also contain additional data encoded in the query portion of the URL that will be communicated to the server computer 430. The additional data may be encoded using any suitable technique as will be understood by those skilled in the art. The <form> tag's method attribute may specify the use of the GET method for submission, and its action attribute may designate a path to a resource 434 on remote server 430.

Client computer 410 typically has access over the Internet 420 to a server computer 430 running a web server or other computer program 431 capable of servicing requests for resources residing on one or more data storage devices 432 either connected directly to the server computer 430 or available over a network. In the example, when a user using client computer 410 instructs web browser 411 to access HTML document 413, web browser 411 transfers the document from the data storage device 412 containing the HTML document 413 to the client computer 410. Web browser 411 may then interpret HTML document 413. The HTML document 413 may contain, among other things, several <img> tags. When the web browser 411 processes each individual <img> tag in HTML document 413 it may issue a GET request to the server specified in the tag's src attribute URL for the resource specified in the path portion of the same URL (the resource can be a file or CGI script, JSP, or other active component). In the illustrated case, web browser 411 may accordingly issue a GET request across the Internet 420 to web server 431 for resource 433. Typically, web server 431 upon receiving this request, processes it as appropriate, extracts the additional information that was encoded in the requested URL, and then serves a response to the web browser 411 across the Internet 420. Additional information extracted from the requested URL can be processed as appropriate and then temporarily stored by web server 411 in a database or other resource capable of storing data 435.

The HTML document 413 may also contain a form. When the user submits a form contained in HTML document 413, web browser 411 submits the form data to a server having access to the data sent in one or more GET requests. In certain embodiments, the server can also be a web server 431, although, in at least some embodiments portions of the functionality may be separated and deployed on a plurality of servers. Upon receiving the request, web server 431 may process it as is appropriate. The data received by the web server 431 typically contains, among other data, an identification number or code that permits web server 431 to correctly associate this newly received data with the data that was previously received and stored in resource 435. Web server 431 may now retrieve the appropriate data from resource 435, reassemble it as necessary, process it along with the newly received data, and serve an appropriate response to web browser 411 across the Internet 420.

It will be appreciated that, although each individual GET request sent from the web browser 411 across the Internet 420 to the web server 431 typically suffers from size limitations, in certain embodiments, an arbitrary number of GET requests can be issued such that any desired amount of data can be transmitted from web browser 411 across the Internet 420 to web server 431 using only the GET method.

It will be appreciated that, although in this example the resource 433 referenced by the <img> tags was a separate resource from resource 434 referenced by the <form> tag, such distinction is unnecessary. The same resource could handle both requests as desired and the description provided above treated the two resources separately solely for purposes of clarity. Moreover, in this example all GET requests were described as dispatched by web browser 411 to a common server (web server 431). However, multiple servers could handle the requests just as easily, provided that the multiple servers had access to the data received and subsequently stored by the other servers being used. The embodiments described use of a single server solely for purposes of ease and clarity of description.

Figure 5:
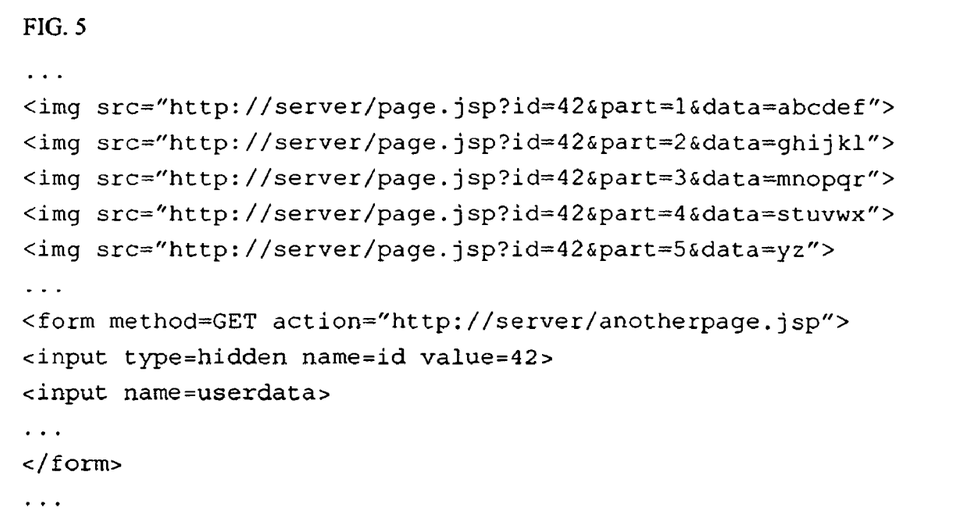
FIG. 5 contains sample HTML code relevant to the invention.

FIG. 5 contains example snippets of HTML code that illustrate a use of the invention. In this very simple example, the HTML page attempts to communicate the alphabet to a server in a situation where only the GET method is allowed and there is a size limit on GET requests that prohibits the sending of the entire alphabet in one GET request. The data describing the alphabet is initially broken up into manageable portions. In this example, no more than six letters are included in each portion. To allow the server to reassemble this data correctly each portion is allocated a sequence identification number, here denoted by the name part. Furthermore, this entire page uses the identification number 42 to allow the server to distinguish between different users communicating with the server concurrently. Interpretation of these <img> tags permits the browser to send the desired data to the resource page.jsp on the server. Typically, a resource can include a static file or document or an active component such as a CGI program, Java Server Page (JSP), or Active Server Page (ASP). In this example, the data is sent the resource to a JSP. This resource typically processes the data encoded in the URL and stores it temporarily on the server. Upon receipt of all of the data by the server, the server can process the data appropriately. Processing may include reassembling data in the correct order using the id and part values.

The example code may also include HTML to create a simple form for obtaining data from the user not necessarily known at the time the HTML page is created. The method attribute can be set to use the GET method, and the action may refer to a path on the same server that was designated in the src URL of the <img> tags. The path can refer to the same page used by the src URL of the <img> tags or to a separate page. In this example, a different page is used for the sole purpose of clarity of description. The form may include various data fields. In certain embodiments, the form typically includes a hidden field (or field that is not hidden) that communicates the id to the server and identifies data to be obtained from the user.

The examples provided represent very simple embodiments of the invention. Other, more complex examples can be found in certain embodiments which support encryption applications. In one encrypted message application, instead of sending the alphabet to the server the payload of the encrypted message can be broken up and sent to the server. The id can be useful in enabling each of a plurality of users to access the server simultaneously for reading their respective encrypted messages without interfering with the other user. The part identifier operates to facilitate correct reassembly of the fragmented payload. The user data typically includes a user name and password or other suitable form of credentials. The server can then reassemble the encrypted message, check the credentials, use the correct credentials to decrypt the message, and serve the decrypted message back to the user. In certain embodiments, apportioned components of an original data block can be individually encrypted prior to transmission and after decryption of the individual components, reassembly of the original data block can occur.

Figure 6:
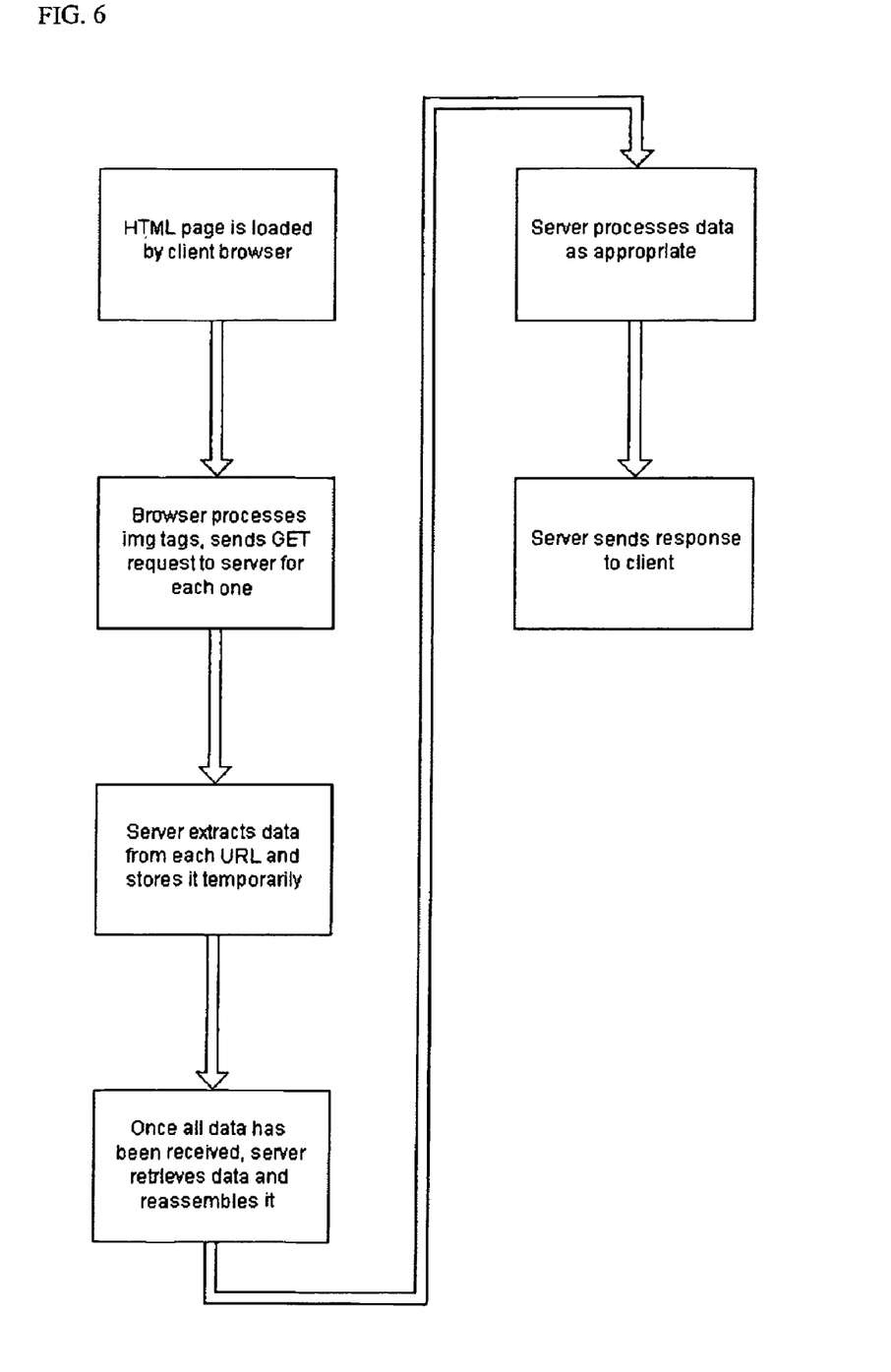
FIG. 6 illustrates the process of using the invention with no input from the user.

FIG. 6 illustrates an example of a process for transmitting an arbitrary amount of data from a client to a server using only the HTTP GET method without requiring input from the user. The process begins when an HTML file is loaded by a web browser or other program capable of processing HTML. As each <img> tag contained within the HTML is processed, the browser sends a GET request for each <img> tag. The server can then extract the data from each URL and store it temporarily. When all of the data has been received the server may retrieve and reassemble the data, process it, and send an appropriate response back to the client.

Figure 7:
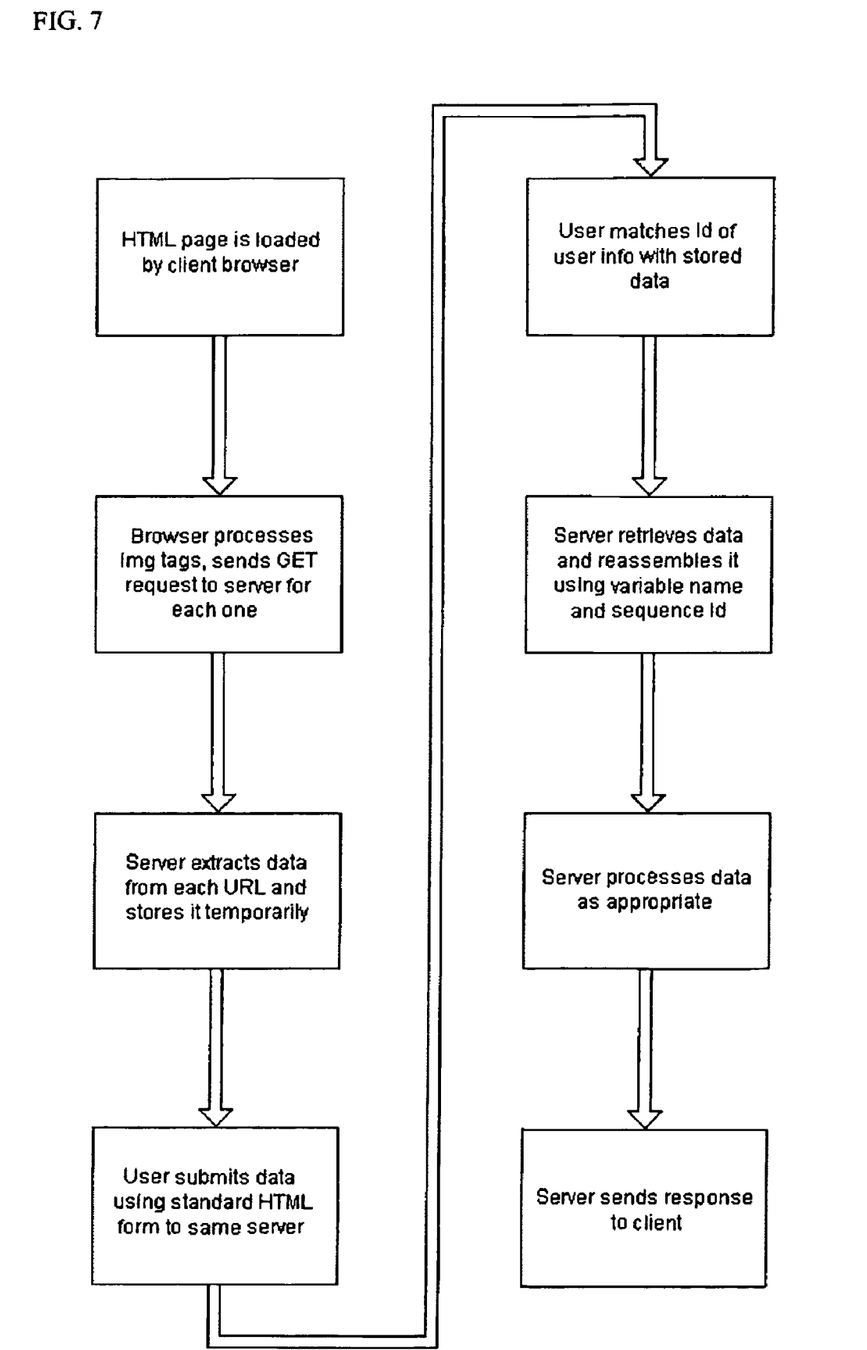
FIG. 7 illustrates the process of using the invention with input from the user.

FIG. 7 illustrates an example of a process for transmitting an arbitrary amount of data from a client to a server using only the HTTP GET method and also for obtaining data from a user. The process begins when an HTML file is loaded by a web browser or other program capable of displaying HTML. As each <img> tag contained within the HTML is processed the browser may send a GET request for each <img> tag. The server can then extract the data from each URL and store it temporarily. When the user submits the form contained on the HTML page the server may extract the data contained in the form submission. The server can then match the identifier (id) contained in the user submission with the previously submitted data that is currently being stored on the server. This data can be retrieved and reassembled using the variable names and sequence ids. The server may then process the data and send an appropriate response back to the client.

Additional Descriptions of Certain Aspects of the Invention

In certain embodiments, methods for transmitting data are provided which comprise apportioning data among a plurality of HTML GET requests, transmitting the GET requests to a receiver and reassembling the data at the receiver. In some of these embodiments, the transmitter is a client and the receiver is a server. In some of these embodiments, the requests are transmitted over a network where the network may include the Internet. In some of these embodiments, the step of apportioning includes embedding portions of the data in attributes of HTML tags. In some of these embodiments, the HTML tags are assembled into one or more HTML pages. In some of these embodiments, each of the HTML tags causes an HTML viewer to issue a GET request to the server specified by a selected attribute of the each tag. In some of these embodiments, the HTML tag is an <img> tag and the selected attribute is a src attribute. In some of these embodiments, the step of apportioning includes embedding identifying information in the attributes, wherein identifying information in each attribute identifies the portion of the data embedded in the each attribute. In some of these embodiments, the identifying information includes a variable name, identification number, and sequence number. In some of these embodiments, the identifying information is encrypted. In some of these embodiments, the step of transmitting includes transmitting the number of data portions and the size of the data portion embedded in each attribute. In some of these embodiments, the transmitted number and size are encrypted. In some of these embodiments, the step of transmitting includes sending a hash of the data and a key to the server. In some of these embodiments, the hash and key are encrypted. In some of these embodiments, the GET requests are temporarily stored on a server. In some of these embodiments, the reassembled data is a copy of a data block to be transmitted from a client to a server or other recipient. In some of these embodiments, the apportioned data is a copy of a data block to be transmitted from a client to a server or other recipient.

In certain embodiments, methods for receiving data are provided that comprise extracting a data portion from each of a plurality of GET Requests, wherein the data portions are embedded in attributes of the GET requests and assembling a data block from the data portions. In some of these embodiments, the data portions are temporarily stored on a server. In some of these embodiments, the data portions are encrypted and the step of extracting includes decrypting the data portions. In some of these embodiments, the data block is encrypted and further comprising the step of decrypting the data block. In some of these embodiments, the step of extracting includes identifying a sequence of GET requests required for assembling the data block and identifying in the attributes of each GET request, the size of a data portion embedded in the each GET request. In some of these embodiments, the sequence of GET requests is derived from additional information embedded in the attributes. In some of these embodiments, the step of extracting includes decrypting information in the attributes. In some of these embodiments, the attributes include a src attribute associated with an HTML <img> tag. In some of these embodiments, the methods also comprise the step of verifying the data block using a hash of a transmitted data block and a secret key associated with the server. In some of these embodiments, the methods also comprise the step of signaling transmission completion with an additional GET request. In some of these embodiments, the additional GET request includes further data. In some of these embodiments, the additional GET request is initiated by an HTML form submission.

In certain embodiments, methods comprise transmitting arbitrarily large amounts of data over a network, from a client to a server, using only the HTTP GET method. In some of these embodiments, the methods further comprise splitting said data into manageable chunks and sending each chunk as an individual GET request. In some of these embodiments, the methods further comprise embedding said chunks of data in attributes of HTML tags that require a download by the HTML viewer, thus forcing the HTML viewer to send requests to the server. In some of these embodiments, said HTML tag is the <img> tag and said attribute is the src attribute. In some of these embodiments, the methods further comprise embedding identifying information in each of said chunks in addition to said data. In some of these embodiments, said identifying information is a variable name, identification number, and sequence number. In some of these embodiments, the methods further comprise encrypting said identifying information to avoid tampering. In some of these embodiments, the methods further comprise sending additional information to the server about the data. In some of these embodiments, said information includes the number of chunks and the chunk size. In some of these embodiments, said information includes a hash of said data and something known only to the server to avoid tampering. In some of these embodiments, the methods further comprise encrypting said additional information to avoid tampering. In some of these embodiments, said network is the Internet. In some of these embodiments, the methods further comprise storing said chunks on the server temporarily.

In some of these embodiments, the methods also comprise utilizing data at the server that was sent to the server stored temporarily on the server. In some of these embodiments, utilization includes using embedded chunk identifying information to correctly reassemble or otherwise process said data. In some of these embodiments, the methods further comprise decrypting and verifying said chunk identifying information when said information is sent encrypted. In some of these embodiments, the methods further comprise using the additional information to process or verify said data. In some of these embodiments, verification includes hashing the data along with a secret known only to the server and comparing the result with the hash sent to the server. In some of these embodiments, the methods further comprise decrypting and verifying said additional information when said information is sent encrypted. In some of these embodiments, the methods further comprise signaling transmission completion with an additional request from the client. In some of these embodiments, said request contains additional dynamic data from the client. In some of these embodiments, said request is initiated by an HTML form submission inside a web browser or other HTML viewer.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method for transmitting data comprising:
apportioning data into a plurality of data portions that are to be embedded into a plurality of URLs included in a plurality of HTML GET requests that send the data to a receiver;
embedding the plurality of data portions into the plurality of URLs that are included in source attributes of HTML tags;
wherein the size of each of the plurality of HTML GET requests is less than a size limit of the receiver, and the size of the data is greater than the size limit;
transmitting the GET requests to the receiver;
at the receiver, extracting the plurality of data portions from the plurality of URLs;
reassembling the data at the receiver;
wherein the method is performed by one or more computing devices.

2. A method according to claim 1, wherein the HTML tags are assembled into one or more HTML pages.

3. A method according to claim 1, wherein each of the HTML tags causes an HTML viewer to issue a GET request to a server specified by a selected attribute of the each tag.

4. A method according to claim 3, wherein the HTML tag is an <img> tag and the selected attribute is a source attribute.

5. A method according to claim 1, wherein the step of apportioning includes embedding identifying information in a selected attribute of one HTML tag, wherein the identifying information identifies one portion of the data that is embedded in another attribute of the one HTML tag.

6. A method according to claim 5, wherein the identifying information includes a variable name, identification number, and sequence number.

7. A method according to claim 5, wherein the identifying information is encrypted.

8. A method according to claim 1, wherein the step of transmitting includes transmitting the number of the plurality of data portions and the size of the data portion embedded in each source attribute.

9. A method according to claim 8, wherein the transmitted number and size are encrypted.

10. A method according to claim 1, wherein the step of transmitting includes sending a hash of the data and a key to the receiver.

11. A method according to claim 10, wherein the hash and key are encrypted.

12. A method according to claim 1, wherein the GET requests are temporarily stored on a server.

13. A method according to claim 1, wherein the reassembled data is a copy of a data block to be transmitted from a client to a server.

14. A method for receiving data comprising:
    extracting a data portion from each of a plurality of GET requests that sent the data portions, wherein the data portions are embedded in a plurality of URLs that are included in source attributes of HTML tags;
    wherein the size of each of the plurality of GET requests is less than a size limit, and the size of the data is greater than the size limit; and
    assembling a data block from the data portions;
    wherein the method is performed by one or more computing devices.

15. A method according to claim 14, wherein the data portions are temporarily stored on a server.

16. A method according to claim 15, wherein the step of extracting includes:
    identifying a sequence of GET requests required for assembling the data block; and
    identifying in the attributes of each GET request, the size of a data portion embedded in the each GET request.

17. A method according to claim 15, and further comprising the step of verifying the data block using a hash of a transmitted data block and a secret key associated with the server.

18. A method according to claim 14, wherein the data portions are encrypted and the step of extracting includes decrypting the data portions.

19. A method according to claim 14, wherein the data block is encrypted and further comprising the step of decrypting the data block.

20. A method according to claim 14, wherein the step of extracting includes decrypting information in the attributes.

21. A method according to claim 14, wherein the attributes include a src attribute associated with an HTML <img> tag.

22. A method according to claim 14, further comprising the step of receiving an additional GET request that signals transmission completion.

23. A method according to claim 22 wherein the additional GET request includes further data.

24. A method according to claim 22 wherein the additional GET request is initiated by an HTML form submission.

25. A method for transmitting data comprising:
    a computing device apportioning data into a plurality of data portions that are to be embedded into a plurality of URLs, wherein the plurality of URLs are included in a plurality of HTML GET requests that send the data to a receiver;
    embedding the plurality of data portions into the plurality of URLs that are included in source attributes of HTML tags;
    wherein the size of each of the plurality of HTML GET requests is less than a size limit enforced at the receiver, and the size of the data is greater than the size limit;
    transmitting the plurality of HTML GET requests to the receiver;
    at the receiver, extracting the plurality of data portions from the plurality of URLs; and
    reassembling the data at the receiver from the extracted plurality of data portions.

26. The method of claim 25, wherein the source attributes of HTML tags include a src attribute in an <img> tag.

27. The method of claim 25, wherein the step of the computing device apportioning the data further includes embedding identifying information in a first attribute of one HTML tag, wherein the identifying information identifies one portion of the data that is embedded in a second attribute of said one HTML tag, and wherein the identifying information includes one or more of a variable name, an identification number, and a sequence number.

28. The method of claim 25, wherein the step of transmitting includes sending a hash of the data and a key to the receiver.

* * * * *

UNITED STATES PATENT AND TRADEMARK OFFICE
CERTIFICATE OF CORRECTION

| | | |
|---|---|---|
| PATENT NO. | : 8,005,920 B2 | Page 1 of 1 |
| APPLICATION NO. | : 11/467113 | |
| DATED | : August 23, 2011 | |
| INVENTOR(S) | : Cayce M. Ullman et al. | |

It is certified that error appears in the above-identified patent and that said Letters Patent is hereby corrected as shown below:

Claim 21, column 14, line 6 After "the" insert --source--.

Signed and Sealed this
Twenty-ninth Day of November, 2011

David J. Kappos
*Director of the United States Patent and Trademark Office*